US008935300B1

(12) United States Patent
Maeng

(10) Patent No.: US 8,935,300 B1
(45) Date of Patent: Jan. 13, 2015

(54) METHODS, DEVICES, AND MEDIUMS ASSOCIATED WITH CONTENT-SEARCHABLE MEDIA

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 626 days.

(21) Appl. No.: 12/983,826

(22) Filed: Jan. 3, 2011

(51) Int. Cl.
*G06F 17/30* (2006.01)

(52) U.S. Cl.
USPC .......................................... 707/805; 715/716

(58) Field of Classification Search
USPC .......... 707/705, 726, 805, 912, 913, 914, 916, 707/917, 600, 603, 607, 736, 737, 740, 754, 707/803, 941, 999.001, 999.107, 802, 804, 707/915, 707, 812, 999.1, 999.102, 999.2, 707/708; 715/201, 202, 205, 700, 717, 718, 715/719, 727, 704, 705, 711, 712, 713, 714, 715/716, 764, 780, 721, 783, 790, 804; 705/1.1, 2.3, 201, 202, 205
See application file for complete search history.

(56) References Cited

U.S. PATENT DOCUMENTS

| 5,572,260 | A | 11/1996 | Onishi et al. |
| 6,338,059 | B1 | 1/2002 | Fields et al. |
| 7,574,451 | B2 * | 8/2009 | Burges et al. ........................ 1/1 |
| 7,725,447 | B2 * | 5/2010 | Subramaniam et al. ...... 707/705 |
| 7,730,405 | B2 * | 6/2010 | Gulli et al. .................... 715/719 |
| 8,151,301 | B2 * | 4/2012 | Bennett ............................ 725/41 |
| 8,677,394 | B2 * | 3/2014 | Rouse et al. ..................... 725/32 |
| 2002/0067428 | A1 | 6/2002 | Thomsen |
| 2003/0051252 | A1 | 3/2003 | Miyaoku et al. |
| 2003/0066085 | A1 * | 4/2003 | Boyer et al. ................... 725/104 |
| 2004/0181755 | A1 | 9/2004 | Murata et al. |
| 2006/0149813 | A1 * | 7/2006 | Janik ............................. 709/203 |
| 2007/0067268 | A1 | 3/2007 | Dai et al. |
| 2007/0162850 | A1 * | 7/2007 | Adler et al. .................... 715/700 |
| 2007/0300249 | A1 | 12/2007 | Smith et al. |
| 2008/0059526 | A1 | 3/2008 | Murakoshi |
| 2008/0183698 | A1 | 7/2008 | Messer et al. |
| 2008/0204595 | A1 | 8/2008 | Rathod et al. |
| 2008/0281579 | A1 | 11/2008 | Tsukiji et al. |
| 2010/0153831 | A1 * | 6/2010 | Beaton .......................... 715/201 |
| 2010/0211636 | A1 * | 8/2010 | Starkenburg et al. .......... 709/203 |
| 2011/0209177 | A1 * | 8/2011 | Sela et al. ........................ 725/39 |
| 2011/0270831 | A1 * | 11/2011 | Xie et al. ....................... 707/736 |
| 2011/0321095 | A1 * | 12/2011 | Yao et al. ......................... 725/41 |

OTHER PUBLICATIONS

Samsung, "The Wonder of Samsung Smart TVs", http://www.samsung.com/us/article/the-wonder-of-samsung-smart-tvs, downloaded Apr. 6, 2011, 5 pages.
Panasonic Consumer Electronics Company, "Panasonic Announces Availability of its First VIERA Cast Web-Enabled Plasma HDTV", Secaucus, New Jersey, May 20, 2008, 4 pages.

(Continued)

*Primary Examiner* — Greata Robinson
(74) *Attorney, Agent, or Firm* — Stolowitz Ford Cowger LLP

(57) ABSTRACT

Streaming media may include a plurality of visual objects. User-selectable fields may be associated with the visual objects. In response to receiving a selection from the user-selectable fields, a search criteria associated with the corresponding visual object may be identified. A method, device, or medium may be associated with a request for search results based on the search criteria. Information associated with the search results may be displayed to the user.

52 Claims, 7 Drawing Sheets

(56) References Cited

OTHER PUBLICATIONS

MHEG, "Information Technology—Coding of Multimedia and Hypermedia Information—Part 7: Interoperability and Conformance Testing for MHEG-5", ISO/IEC JTC 1/SC 29, Sep. 22, 1998, 73 pages.

Stolowitz Ford Cowger, LLP, "Listing of Related Cases", Sep. 7, 2011, 1 page.

* cited by examiner

METHODS, DEVICES, AND MEDIUMS ASSOCIATED WITH CONTENT-SEARCHABLE MEDIA

BACKGROUND

Known electronic devices may be used for personal and/or business purposes. For example, a personal and/or a business computer may be used to access the Internet, a television may be used to watch a program, or a smart-phone may be used to initiate a phone call or to exchange a text message or an email message.

Each known device may have its own display and corresponding controller. Consequently, a user of such known devices may accumulate a plurality of controllers and a plurality of corresponding displays within the process of accumulating such known electronic devices. Moreover, such known electronic devices may process different types or the same types of media, depending on the source of the media and/or the intended use of the media.

DETAILED DESCRIPTION

Figure 1:
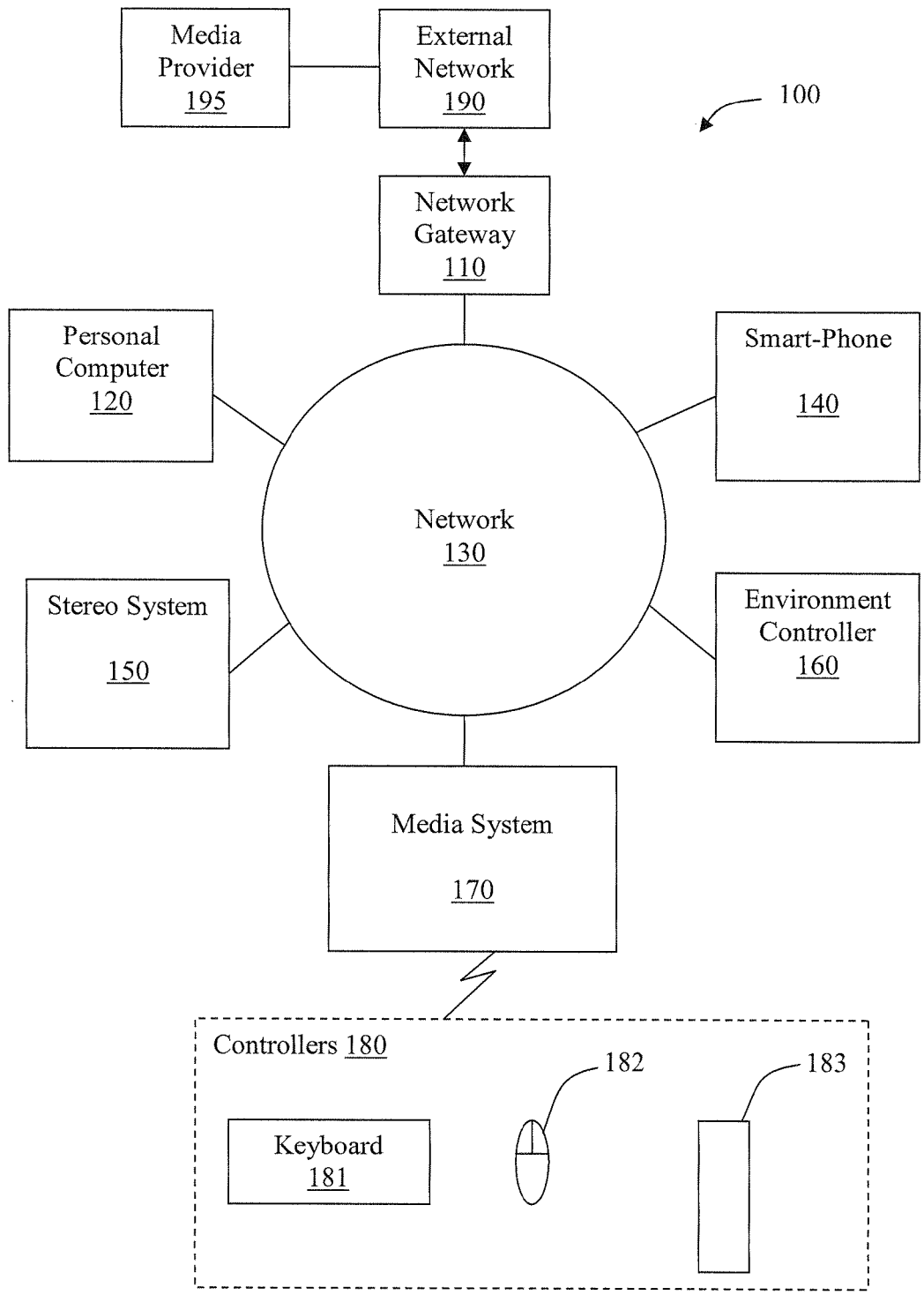
FIG. 1 depicts a block diagram of a media system including a plurality of devices.

FIG. 1 depicts a block diagram of an exemplary media system 170 including a plurality of devices 100. Devices 100 may include a plurality of electronic devices operatively coupled to a network 130. Network 130 may be a public network or a private network established for personal use, business use, or any combination thereof.

Network 130 may be operatively coupled to an external network 190 via a network interface, such as a network gateway 110. External network 190 may comprise a private intranet or a public network, such as the Internet. External network 190 may be operatively coupled to a service provider 195, such as a media service provider, to network 130. External network 190 may comprise a network associated with or operated by service provider 195. Service provider 195 may comprise a media service provider, such as a cable network provider, a satellite network provider, a cellular network provider, a telephone network provider, a broadband network provider, or any combination thereof. Network gateway 110 may comprise a router or a modem that operatively couples network 130 to external network 190.

Devices 100 may include media system 170 and one or more controllers 180. In one example, media system 170 may comprise a home entertainment apparatus, a gaming system, a media player, a customer premise node, a set-top box, or any combination thereof. Media system 170 may comprise a computing device operatively coupled to a television set. In another example, media system 170 may be integrated into a multi-media television.

Controllers 180 may include a keyboard 181, a pointing device 182, e.g., a mouse, a remote controller 183, or any combination thereof. Controllers 180 may be configured to control any of devices 100, such as media system 170. Controllers 180 may be configured to communicate with devices 100 via wired or wireless communications, such as via Ethernet, infrared, radio wave, cellular, optical, BLUETOOTH (registered trademark), WI-FI (registered trademark), other types of communication signals and networks, or any combination thereof.

In another example, devices 100 may include a personal computer 120, a mobile telephone 140, e.g., a smart-phone, a stereo system 150, an environmental control device 160, or any combination thereof. Environmental control device 160 may be configured to control or to operate other devices or systems. For example, environmental control device 160 may be configured to automate or to control a thermostat, an alarm system, lighting, or the like, or any combination thereof, associated with a home or other building.

Devices 100 may be operatively coupled to media system 170 via network 130. Network 130 may be a wired network, a wireless network, or any combination thereof. For example, personal computer 120 may be operatively coupled to media system 170 via an Ethernet based wired network, environmental control device 160 may be operatively coupled to media system 170 via a wireless network, such as WI-FI, and/or stereo system 150 may be operatively coupled to media system 170 via a Bluetooth network. Those of ordinary skill in the art readily will understand that in different examples any or all of devices 100 may be operatively coupled to media system 170 via wired or wireless communication couplings.

As devices 100 perform computer or processing functions, media system 170 may treat the functions as occurring on a processor of media system 170. Media system 170 may use controllers 180 to interact with devices 100 operatively coupled to media system 170 as if devices 100 were physically interacting with media system 170. Each of devices 100 may monitor and record any changes in their screen's appearance, compress and encrypt information associated with such changes, and send the compressed and encrypted information to media system 170. Media system 170 then may decrypt and decompress the information, and cause the information to be displayed to the user via a single display device. Devices 100 may send media, e.g., audio and/or video, to media system 170. Media system 170 may send data or operational commands to devices 100 operatively coupled to media system 170 to control respective functions of devices 100.

Figure 2:
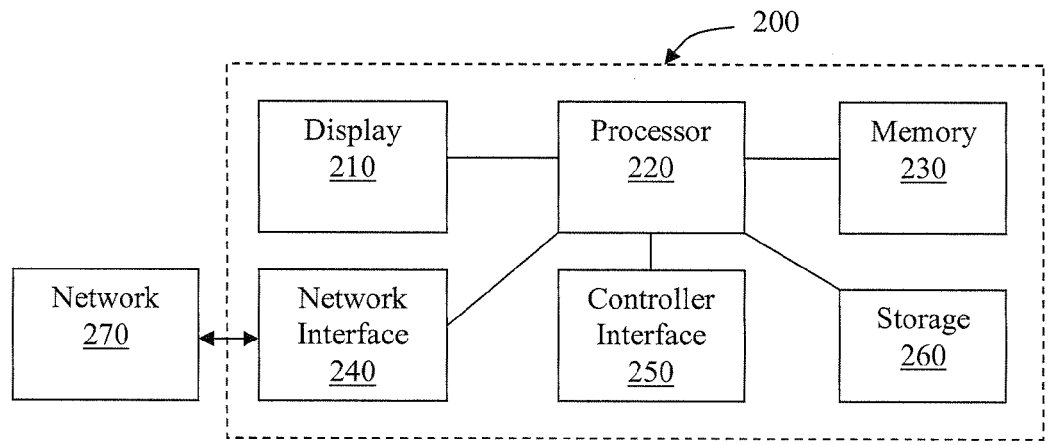
FIG. 2 depicts an example of a media system, as set forth in FIG. 1.

FIG. 2 depicts an exemplary media system 200, as set forth in FIG. 1. Media system 200 may comprise a processing device 220 operatively coupled to a memory 230, a storage 260, a controller interface 250, a network interface 240, and a display 210. Network interface 240 also may comprise electronic circuits or programs configured to interface or communicate with a network 270, such as a wired network, a wireless network, or any combination thereof. In one example, and similar to network 130 (FIG. 1), network 270 may operatively couple a plurality of devices, such as devices 100. Network 270 may comprise or be operatively coupled to an external network, such as network 190 (FIG. 1).

Controller interface 250 may provide media system 200 with an interface to one or more controllers, such as controllers 180 (FIG. 1). The controllers may be configured to provide user control of media system 200. Controller interface 250 may comprise a radio transceiver or an optical transceiver for wireless communications with the controllers, or may communicate via a cable or wired communication, or any combination thereof. One or more of memory 230 and storage 260 may be configured to store instructions associated with an application program.

Processing device 220 may be configured to execute stored instructions. Processing device 220 may access memory 230 and/or storage 260 to run, store, and archive one or more programs. Memory 230 and/or storage 260 may comprise RAM, ROM, or other types of storage or memory devices.

Processing device 220 may be configured to manage and to control any or all of devices 100 (FIG. 1). Processing device 220 further may be configured to receive input or commands from a user via controller interface 250 and one or more controllers. Communication to the user may be provided by displaying information on display 210. Display 210 may be a display that identifies the operational status of media system 200. In one example, display 210 may comprise a television, a monitor, a smart-phone, a plasma screen, a LCD screen, a projection screen, or the like, or any combination thereof. Display device 210 may be configured to display media in addition to the operational status or other types of media system information.

In one example, media system 200 may comprise a set-top box or stand alone device. In another example, media system 200 may be an integral part of a television or a multi-media processing apparatus.

Figure 3:
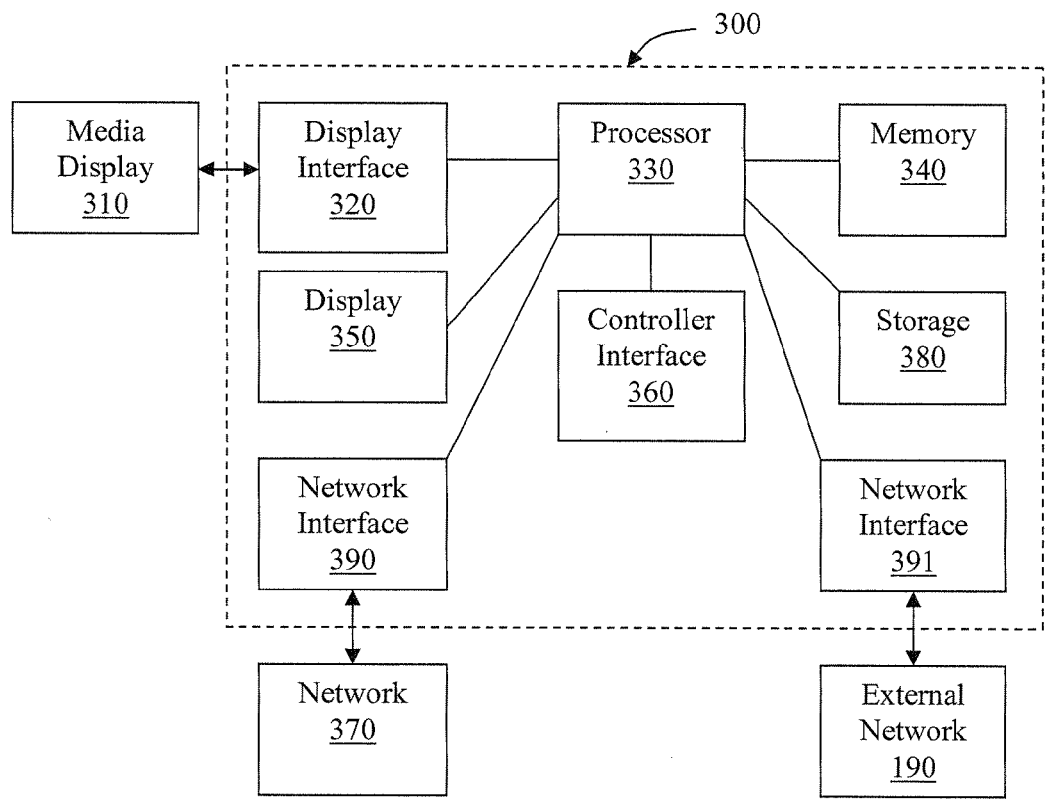
FIG. 3 depicts another example of a media system, as set forth in FIG. 1.

FIG. 3 depicts another exemplary media system 300, as set forth in FIG. 1. Media system 300 may comprise a processing device 330, a memory 340, a storage 380, a controller interface 360, and a display 350, similar to that described above with respect to media system 200 and as depicted in FIG. 2. Display 350 may be a display that identifies the operational status of media system 300, for example, to indicate an on or an off condition of media system 300, or to display additional information.

Media system 300 may comprise a first network interface 390 configured to interface with a network 370. In one example, and similar to network 130 depicted in FIG. 1, network 370 may be operatively coupled with a plurality of devices, such as devices 100. Media system 300 further may comprise a second network interface 391 configured to interface or communicate with external network 190, such as the Internet. Information received through first network interface 390 may be processed and then transmitted through second network interface 391, and vice versa. Media or media content transmitted or streamed from external network 190 may be forwarded to network 370 or presented on media display 310.

Controller interface 360 may be configured to provide an interface to one or more controllers, such as controllers 180 (FIG. 1). The controllers may be configured to provide user control of media system 300. One or more of memory 340 and storage 380 may be configured to store instructions associated with an application program.

Processing device 330 may be configured to execute stored instructions. Processing device 330 may be configured to access memory 340 and/or storage 380 to run, store, and archive one or more application programs. The programs may be run responsive to one or more commands or instructions received from the controllers, or responsive to information received over one or both of network 370 and external network 190.

Display interface 320 may interface with media display 310. Media display 310 may be configured to display media in addition to an operational status or other types of information associated with media system 300. The information may be displayed together with the media being presented to the user. Media display 310 may comprise a television, a monitor, a smart-phone, a plasma screen, a LCD screen, a projection screen, other types of display, or any combination thereof. One or more controllers may be configured to provide user control of media display 310, or to utilize media display 310 as a user interface of media system 300.

In one example, media system 300 may comprise a set-top box or stand alone device operatively coupled to media display 310. In another example, media system 300 may be an integral part of media display 310, or may be housed in a common containment structure.

Figure 4:
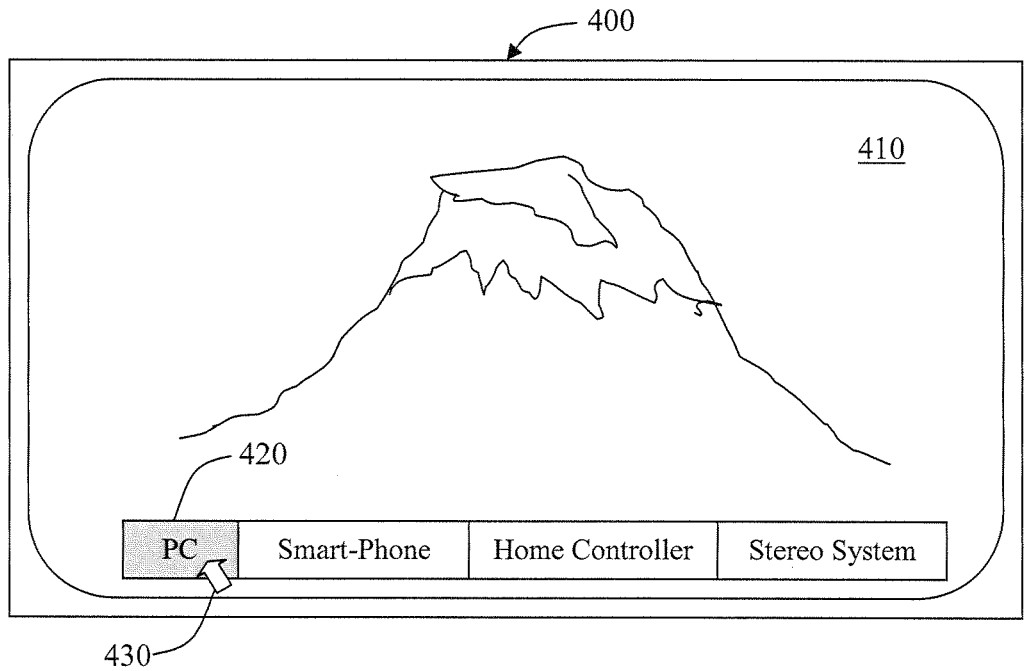
FIG. 4 depicts an example of a media system displaying a plurality of devices.

FIG. 4 depicts an exemplary media system 400 displaying a plurality of devices. Media system 400 may be operatively coupled to, or may comprise, a display device, such as a television set, configured to display media 410. Media 410 may comprise a television program, a recorded program, a video, a live feed, a digital image, animation, audio media, or any combination thereof. Media 410 may comprise streaming media received from a media provider, media that may be stored locally on media system 410, such as in a storage or memory device, or media that may be stored on a portable media device, such as a disk, a flash drive, or a memory card.

Media system 400 may be configured to display a plurality of icons 420, such as user-selectable icons. Icons 420 may represent a plurality of devices, such as devices 100 (FIG. 1), including a television, a personal computer (PC), a smart-phone, a home controller, an audio system, or any combination thereof. The plurality of electronic devices may be operatively coupled to a network, such as network 130 (FIG. 1). Icons 420 may comprise a plurality of computer-generated graphical icons presented on a media display.

Icons 420 may be located at the bottom of media 410, as depicted in FIG. 4; however, those of ordinary skill in the art readily will understand that icons 420 may be located any place on a media display or television screen, including the side, top, or center portions of the display. In one example, icons 420 may be displayed together with media 410. In other examples, icons 420 may overlap media 410 or may replace media 410 on media system 400, such that either one of icons 420 or media 410 may be displayed at any given time.

A pointing device 430 may be configured to select one or more icons 420. Pointing device 430 may be controlled by one or more controllers, such as controllers 180 (FIG. 1). Pointing device 430 may comprise a computer-generated graphical icon, or may be an optical pointing device, such as an LED or laser pointer. In one example, media system 400 may comprise a media display configured with optical receptors that detect light transmitted from pointing device 430 in order to identify a selected icon based on the position of the light on media system 400.

Selection of one or more icons 420 may cause media system 400 to display media content associated with the corresponding electronic device of the selected icon. For example, media 410 may comprise a television program associated with a television set. In an example in which the television icon has not previously been selected, and the associated media is playing on media system 400, the television icon may not appear in the listing of icons 420. In another example, the selected icon may be temporarily disabled or dimmed pending selection of another icon corresponding to a different electronic device.

Media system 400 may be configured to replace the presentation of the television program with a representation of a different electronic device in response to a selection of one or more icons 420 associated with the different electronic device, such as the personal computer (PC). Media 410 that is presented to the user may reflect the most recently selected icon and, accordingly, the corresponding electronic device.

Media system 400 may detect movement of pointing device 430, for example, as a controller is manipulated by a user. Icons 420 may be displayed as a result of the detected movement. Otherwise, icons 420 may not be visible, or may become dimmed, when media system 400 fails to detect any movement of pointing device 430 for a predetermined amount of time. Similarly, pointing device 430 may become visible or invisible according to the detected operation, or absence of operation, of a controller which may operate pointing device 430.

Media system 400 may omit the associated icons from being presented, or may cause the corresponding icons to be invisible, disabled, or dimmed, in response to detecting that one or more of the corresponding electronic devices are not operatively coupled with media system 400. Differentiating icons 420 associated with electronic devices that are not operatively coupled to media system 400 may indicate an availability of the electronic devices for viewing or controlling. Media system 400 may be configured to display the corresponding icon, or otherwise indicate that the electronic device may be available to the user, in response to identifying a restoration of connectivity, or upon initialization, of the corresponding electronic device.

Figure 5:
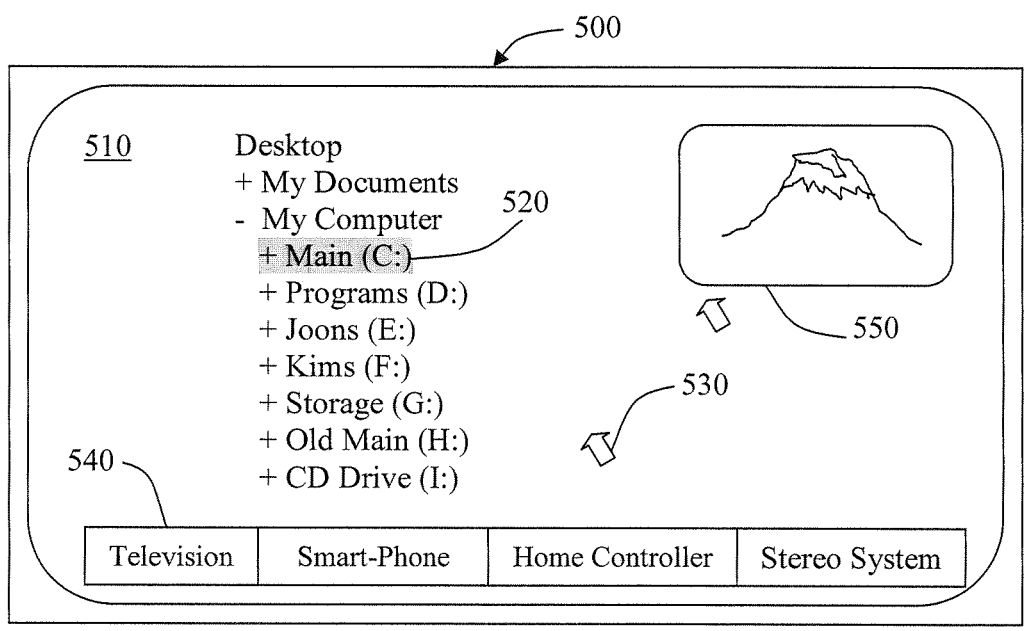
FIG. 5 depicts an example of a media system displaying contents of two or more devices.

FIG. 5 depicts an exemplary media system 500 displaying contents of two or more devices. The contents of a first device may be presented as a first display, such as a primary display 510 of media system 500. For example, primary display 510 may comprise a screen shot or representation of a personal computer including a directory or file hierarchy. The icon associated with primary display 510 may be invisible, disabled, or dimmed. In one example, a plurality of icons 540 displayed by media system 500 may represent other electronic devices which may be selectable but have not been selected.

Pointing device 530 may be configured to select one or more icons 540. Similarly, pointing device 530 may be configured to select one or more fields 520 in primary display 510. For example, when primary display 510 represents a personal computer, pointing device 530 may be configured to select a desktop folder, a menu item, or another field. One or more controllers, such as controllers 180 (FIG. 1), may be configured to operate the personal computer through primary display 510, as if the one or more controllers are directly operating the personal computer. Similarly, any of the electronic devices displayed by media system 500 may be operated by media system 500 through the graphical representation provided as primary display 510.

Primary display 510 may switch to a graphical representation of the electronic device associated with the selected icon. For example, primary display 510 of the personal computer screen displayed in FIG. 5 may be replaced with a screen shot or graphical representation of a smart-phone user interface.

In addition to primary display 510, media system 500 also may be configured to present secondary display 550. Secondary display 550 may be a relatively smaller window which overlays primary display 510, or may be provided as a picture-in-picture mode of operation. In one example, primary display 510 and a second display, such as secondary display 550, may be shown or presented as split screens on media system 500.

In one example or mode of operation, secondary display 550 may comprise a television program, a streaming media, or other type of media associated with, or received by, a television set. A television program may be presented as secondary display 550 in response to a selection of one or more icons 540 as primary display 510. In response to selection of a different icon, media system 500 may replace primary display 510 with media content associated with the different icon, and secondary display 550 may continue to present the television program, for example. Media system 500 may be configured to turn on or to turn off secondary display 550. Media system 500 may be configured to present the media content associated with a television program as primary display 510 in response to a selection of the television icon, or in response to secondary display 550 being turned off.

The user may determine how the contents of the corresponding device will be displayed. The selection of icons 540 may include a designation of the corresponding electronic device to be presented as primary display 510 or secondary display 540. For example, the smart-phone icon may be selected to replace the representation of the personal computer as primary display 510, or the smart-phone icon may be selected to replace the media content of secondary display 550, e.g., the television program. In one example, a plurality of secondary displays may be selected for simultaneous or concurrent display by media system 500. The plurality of secondary displays may be presented together with primary display 510.

Figure 6:
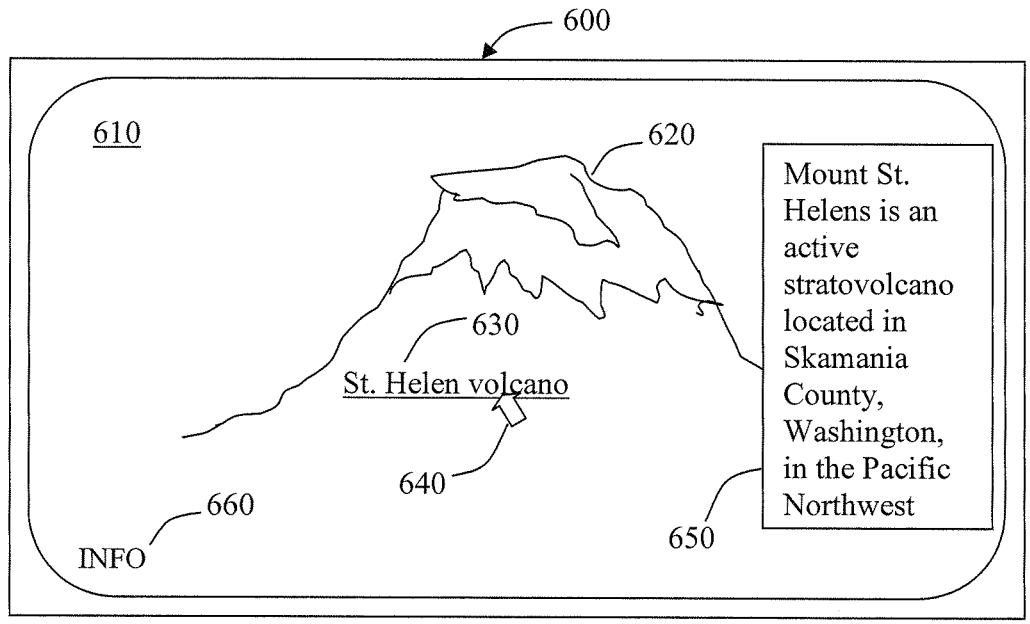
FIG. 6 depicts an example of an apparatus displaying content-searchable media.

FIG. 6 depicts an exemplary apparatus 600 displaying content-searchable media 610. Apparatus 600 may comprise a television, a monitor, a smart-phone, a plasma screen, a LCD screen, a projection screen, other types of displays, or any combination thereof. In one example, apparatus 600 comprises a display or media display as described with respect to one or more of media systems 170, 200, 300, 400, or 500. Content-searchable media 610 may comprise a television program, a motion picture, a recorded program, a video, a live feed, a digital image, animation, other types of media, or any combination thereof.

In one example, content-searchable media 610 may be provided as streaming media from a media content or service provider. Content-searchable media 610 may comprise data broadcast from a media provider to a plurality of subscribers or customer end nodes. Content-searchable media 610 may be received by the plurality of subscribers substantially at the same time, such as in a television broadcast or a live performance or event being simulcast. The media content of content-searchable media 610 may be received continuously by the subscribers over the duration of the broadcast, performance, or event. Content-searchable media 610 may be prerecorded or comprise a motion picture broadcast to the plurality of customers from a media provider. Streaming media may be processed for content-searchable media 610 by a media system located at the customer premise during receipt of streaming media.

Content-searchable media 610 may be associated with one or more user-selectable fields 630. User-selectable fields 630 may correspond with a visual object 620 of content searchable media 610. User-selectable fields 630 may be displayed together with content-searchable media 610.

User-selectable fields 630 may be displayed as a result of detected movement of a pointing device 640. Otherwise, user-selectable fields 630 may not be visible, or may become dimmed, in response to a failure to detect the movement of pointing device 640 for a predetermined amount of time. Similarly, pointing device 640 may be configured to become visible or invisible in response to the detected movement, or absence of movement, of a controller, such as controllers 180 (FIG. 1). An alert notification 660 may be displayed by apparatus 600 to alert the user of an availability of user-selectable fields 630 for selection. Alert notification 660 may be displayed in a corner of apparatus 600, for example, or as a flashing light on a controller.

In one example, user-selectable fields 630 may not be visible to the user, but nevertheless may be selectable in response to pointing device 640 being located generally over visual object 620. In another example, user-selectable fields 630 may be displayed in response to an identification of visual object 620. In yet another example, user-selectable fields 630 may become visible in response to the pointing device 640 passing over visual object 620.

In the example depicted in FIG. 6, visual object 620 may comprise an image of a mountain, such as an image of Mount St. Helens. Apparatus 600 may be configured to display a tag or descriptive name of visual object 620 in response to pointing device 640 being placed over visual object 620. The name of visual object 620 may be displayed as part of user-selectable field 630. In response to the selection of user-selectable field 630, apparatus 600 may be configured to cause information related to visual object 620 to be displayed. Placing pointing device 640 over, or in proximity to, user-selectable field 630, or using pointing device 640 to select, e.g., click, user-selectable field 620 may result in user-selectable field 620 being selected. In one example, user-selectable field 620 may be selected by a key-stroke or numerical selection on a controller.

The information associated with visual object 620 may be displayed in a window 650, such as a text box. Window 650 may include text, hyperlinks, images, or media objects in it. Window 650 may be a relatively smaller window which overlays content-searchable media 610, such as in a picture-in-picture mode of operation. In another example, content-searchable media 610 and window 650 may be displayed as split screens on apparatus 600. In yet another example, the display of content-searchable media 610 may be replaced with the information of window 650 on apparatus 600. Instead of, or in addition to, displaying the information in window 650, the information may be caused to be played out as audio content.

User-selectable fields 630 may comprise a hyperlink embedded into streaming media. The hyperlinks may be embedded in the graphic or visual objects of the streaming media, such as the image of Mount St. Helens. One or more user-selectable fields 630 may comprise hyperlinks. The hyperlinks may be embedded in content-searchable media 610 before being received from the media provider. The media provider or a third party distributor may embed the hyperlinks into content-searchable media 610.

In one example, one or more user-selectable fields 630 may be generated based on an image recognition analysis of visual object 620. For example, a media system may comprise a processing device configured to generate user-selectable fields 630 after receiving the media from the media provider. Visual object 620 may be compared with a library of available images stored locally or over a network to identify a closest match. A tag or descriptive name associated with visual object 620 may then be displayed as one of user-selectable fields 630. The media may be transmitted by the media provider without including any hyperlinks or user-selectable fields 630. The media may become content-searchable after being processed by the media system. User-selectable fields 630 may indicate that corresponding visual objects 620 may be associated with different search criteria.

Figure 7:
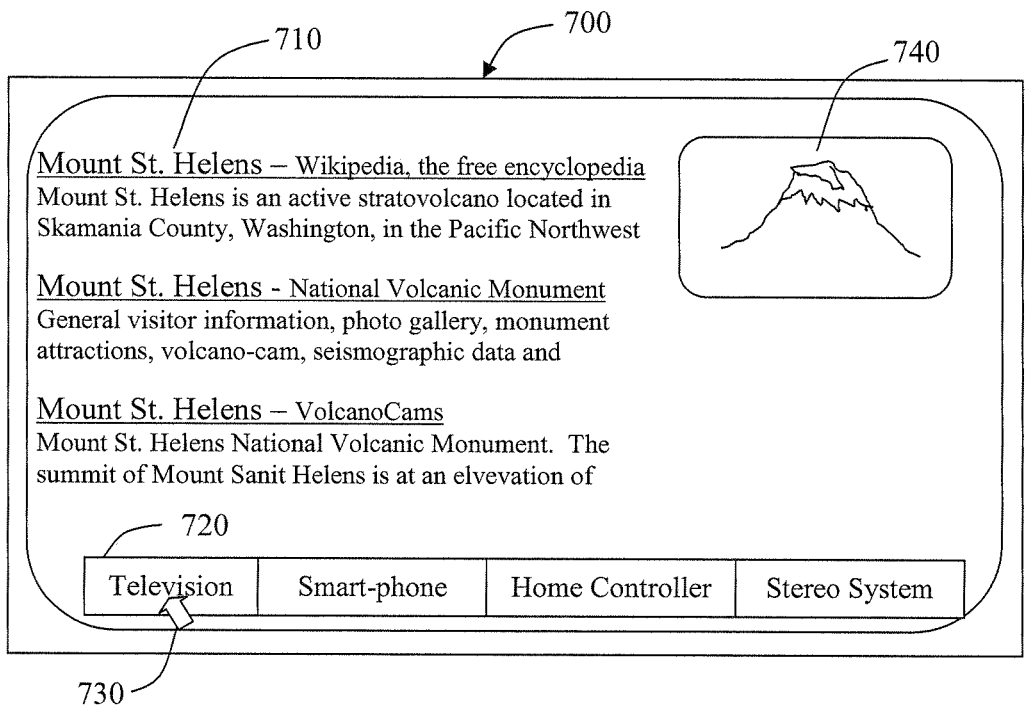
FIG. 7 depicts an example of an apparatus displaying search results.

FIG. 7 depicts an exemplary apparatus 700 displaying search results. The search results may be based on a field selected from user-selectable media content 740. Apparatus 700 may comprise a television, a monitor, a smart-phone, a plasma screen, a LCD screen, a projection screen, other types of display, or any combination thereof. In one example, apparatus 700 comprises a display or media display as described with respect to one or more of media systems 170, 200, 300, 400, or 500.

A selected field may be identified from one or more user-selectable fields of streaming media content. Search criteria may be associated with media content 740. In response to identifying the selected field, a search for information based on the search criteria may be requested. Information 710 associated with the search results may be displayed together with corresponding media content 740. For example, information 710 may be displayed as text that overlays media content 740. An image of media content 740 may be minimized as a picture-in-picture with information 710.

An image of media content 740 may be temporarily paused in response to displaying information 710. The image may be paused in response to receiving a user input. For example, the user input may comprise the selection of a field in media content 740. Pausing the image may allow for the user to review, or initiate further selections from, information 710 without missing any of media content 740 that would otherwise be played. Media content 740 may continue to play from where media content 740 was paused in response to apparatus 700 receiving a further command from the user, or after timing out. In the case of a live feed or streaming media, the playback of media content 740 may be delayed after the pause. For example, media content 740 may be temporarily stored while being paused, and then played from memory in a delayed state of playback which follows receipt of the streaming media.

A user may select a field or hyperlink associated with media content 740, such as a television program, causing information 710 to be displayed on apparatus 700. Information 710 may comprise search results, such as one or more pages from the World Wide Web (WWW). A source for providing information 710 may be identified in response to receiving a selection from information 710, which may comprise a list of search results. In one example, the source may comprise the one or more WWW pages.

Apparatus 700 may be caused to show information 710 concurrently with a display of media content 740, such as a television program. Apparatus 700 may be configured to switch to a graphical representation of the electronic device associated with a selected icon 720 in response to icon 720 being selected. For example, apparatus 700 may replace information 710 with the image of the television program in response to a selection of television icon with a pointing device 730.

A processing device, such as processing device 220 (FIG. 2) or processing device 330 (FIG. 3) may be configured to receive a selection of a field corresponding with a visual object of streaming media presented on a display device or media display. The processing device may be configured to identify, in response to receiving the selection of a field, search criteria associated with the corresponding visual object, and to request search results based on the search criteria. The processing device further may be configured to cause the search results to be displayed together with the media or the streaming media.

A plurality of devices, such as devices 100 (FIG. 1), may be identified on the display device. A selection from the plurality of devices may cause an image of the streaming media to be replaced by functional data associated with a corresponding selected device. The processing device may be configured to transfer functional data between the plurality of devices.

Streaming media may be received from a first data source, and the search results may be received from a second data source. For example, one or both of the first and second data sources may comprise a media provider, a media player, a live video feed, a processing device, a database, a media storage device, a website, a search engine, or any combination thereof. In one example, the processing device may be configured to cause a list of search engines to be displayed, and the search results may be requested from a selected search engine, such as an Internet search engine.

Figure 8:
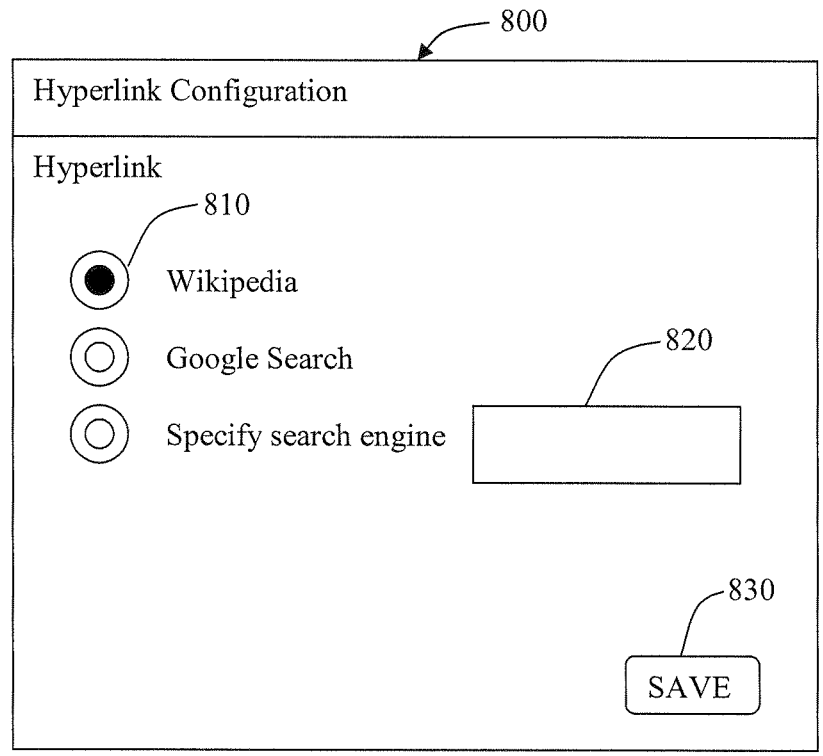
FIG. 8 depicts an example of a configuration tool for selecting a search provider.

FIG. 8 depicts an exemplary configuration tool 800 for selecting a search provider 810. Configuration tool 800 may be configured to provide a list of choices for selecting sources of information or search engines. A default selection may be provided as a factory setting. A user may change search provider 810 to a different search engine or specify a new search engine in a provider box 820. For example, the Uniform Resource Locator (URL) for the new search engine may be typed or otherwise entered into provider box 820. The selection of search provider 810 may be saved 830 as a default or custom setting.

In response to the selection of search provider 810, the media system may obtain the search results for media content from search provider 810. In one example, the selection of search provider 810 may be received prior to the media system receiving the media, e.g., streaming media. The selection of search provider 810 may be completed during configuration of the media system, or as part of an order or request for services from the media provider. In one example, configuration tool 800 may be displayed the first time the user requests search results based on user-selectable media content.

Figure 9:
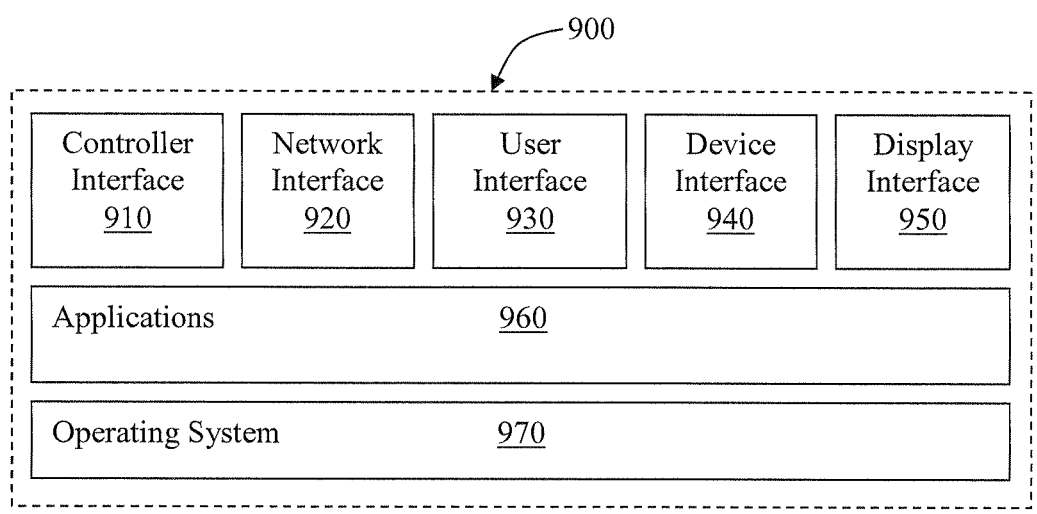
FIG. 9 depicts a block diagram of operation modules configured for operation with a media system.

FIG. 9 depicts a block diagram of exemplary operation modules 900 configured for operation with a media system. Operation modules 900 may comprise a controller interface 910, a network interface 920, a user interface 930, a device interface 940, a display interface 950, applications 960, and an operating system 970.

Controller interface 910 may be configured to interact with one or more controllers, such as controllers 180 of FIG. 1. Network interface 920 may be configured to manage interfaces with one or more networks, such as network 130 and external network 190 of FIG. 1. User interface 930 may be configured to control the features of a media system, such as media system 170 of FIG. 1.

Device interface 940 may be configured to communicate with one or more devices, such as devices 100 of FIG. 1. Device interface 940 may be configured to integrate a plurality of electronic devices with the media system. Display interface 950 may be configured to present information to a display device, such as display 350 or media display 310 of FIG. 3. Applications 960 may include instructions for, or be configured to process media, provide entertainment features, manage devices and networks, perform other functions, or any combination thereof.

In one example, applications 960 may comprise a remote computer access protocol to manage electronic devices over the network. The remote computer access protocol may be a peer-to-peer protocol or a server-based protocol. In a server-based protocol, one of the electronic devices or the media system may act as a server. The remote computer access protocol may provide users with a graphical interface to another computing device. The protocol may utilize ITU-T T.120 series application sharing protocols. The coupled electronic devices and the media system may run a sender protocol and a receiver protocol.

Figure 10:
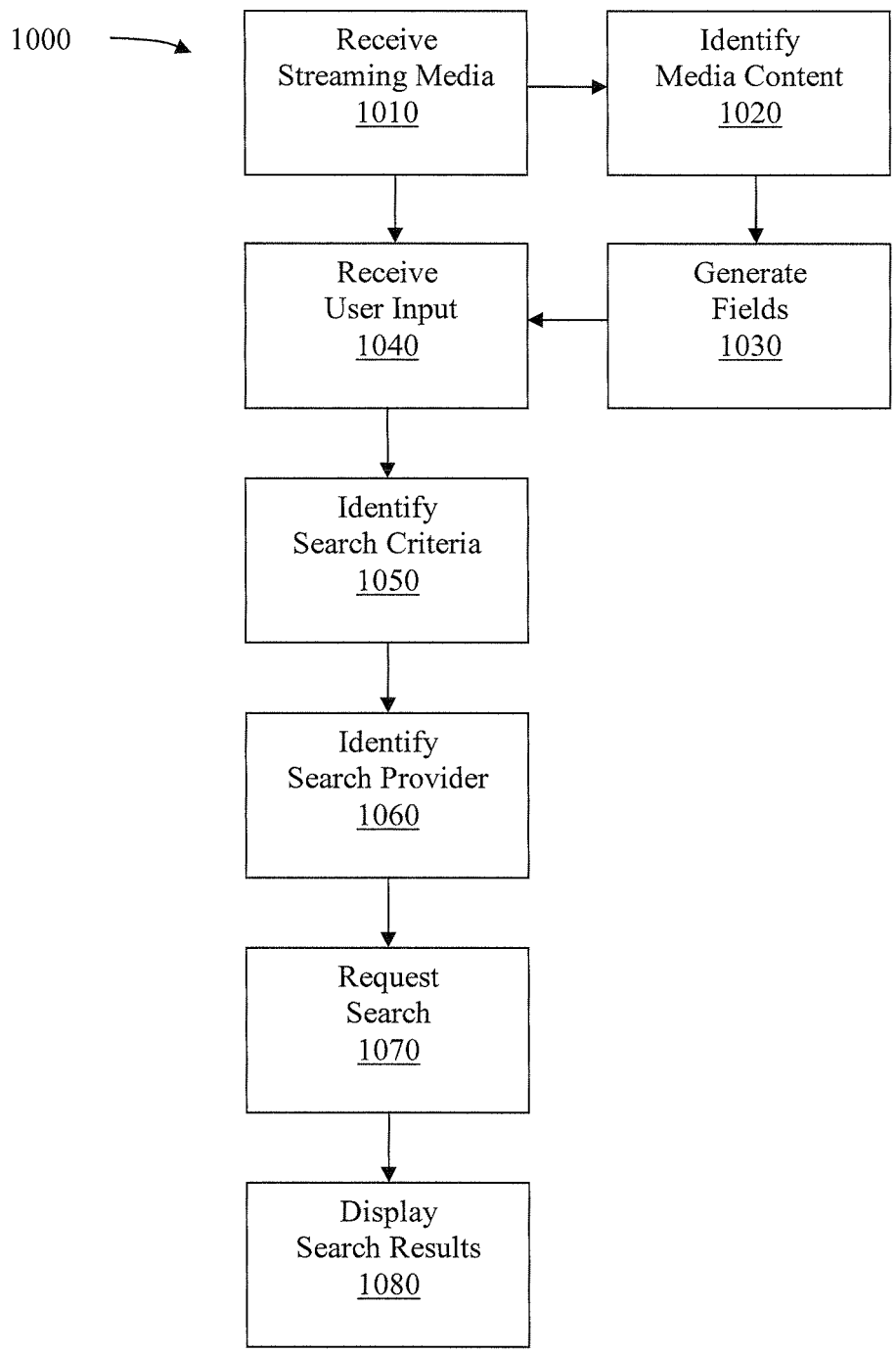
FIG. 10 depicts an example of a process for requesting information associated with content-searchable media.

FIG. 10 depicts an exemplary process 1000 for requesting information associated with content-searchable media. At operation 1010, streaming media may be received, and one or more fields of the streaming media may identify corresponding media content of the streaming media.

At operation 1020, the media content may be identified during a presentation of the streaming media on a display. The media content may be identified based on optical recognition of the streaming media. In one example, the media content may be identified from a sub-title of the streaming media.

At operation 1030, the one or more fields may be generated based on the identification of the media content. In one example, the one or more user-selectable fields may be embedded into the streaming media. The one or more user-selectable fields, or hyperlinks, may be embedded prior to the streaming media being received at operation 1010.

At operation 1040, user input may be received of one or more user-selectable fields corresponding with media content of the streaming media. The one or more fields may visually overlay the media content.

At operation 1050, search criteria associated with the media content may be identified. The search criteria may be associated with the media content in a look-up table. The search criteria may be provided as tags associated with the one or more user-selectable fields. In one example, the visual written description of the one or more user-selectable fields may provide the search criteria.

At operation 1060, a search provider may be identified to perform the search. The search provider may be identified or otherwise based on a configurable selection tool. In one example, the search provider may be identified in the configurable selection tool prior to presenting the streaming media on a display device.

At operation 1070, a search for information based on the search criteria may be requested. The search information may be requested in response to receiving the user input at operation 1040.

At operation 1080, the information from the search may be presented on a display device. In one example, the information may be presented on the display device together with the streaming media.

The exemplary process 1000 depicted by FIG. 10 and the associated operations may be performed by one or more processing devices, such as processing device 220 or processing device 330 of FIGS. 2 and 3, respectively. In one example, a media provider, such as media provider 195 (FIG. 1), may be configured to distribute the media content from one or more memory devices (e.g., memory 230 and/or storage 260 of FIG. 2) to one or more customer nodes or endpoints. The media content may be distributed as streaming video. The one or more endpoints may comprise a distributed network of user devices configured to receive and play the media content.

Figure 11:
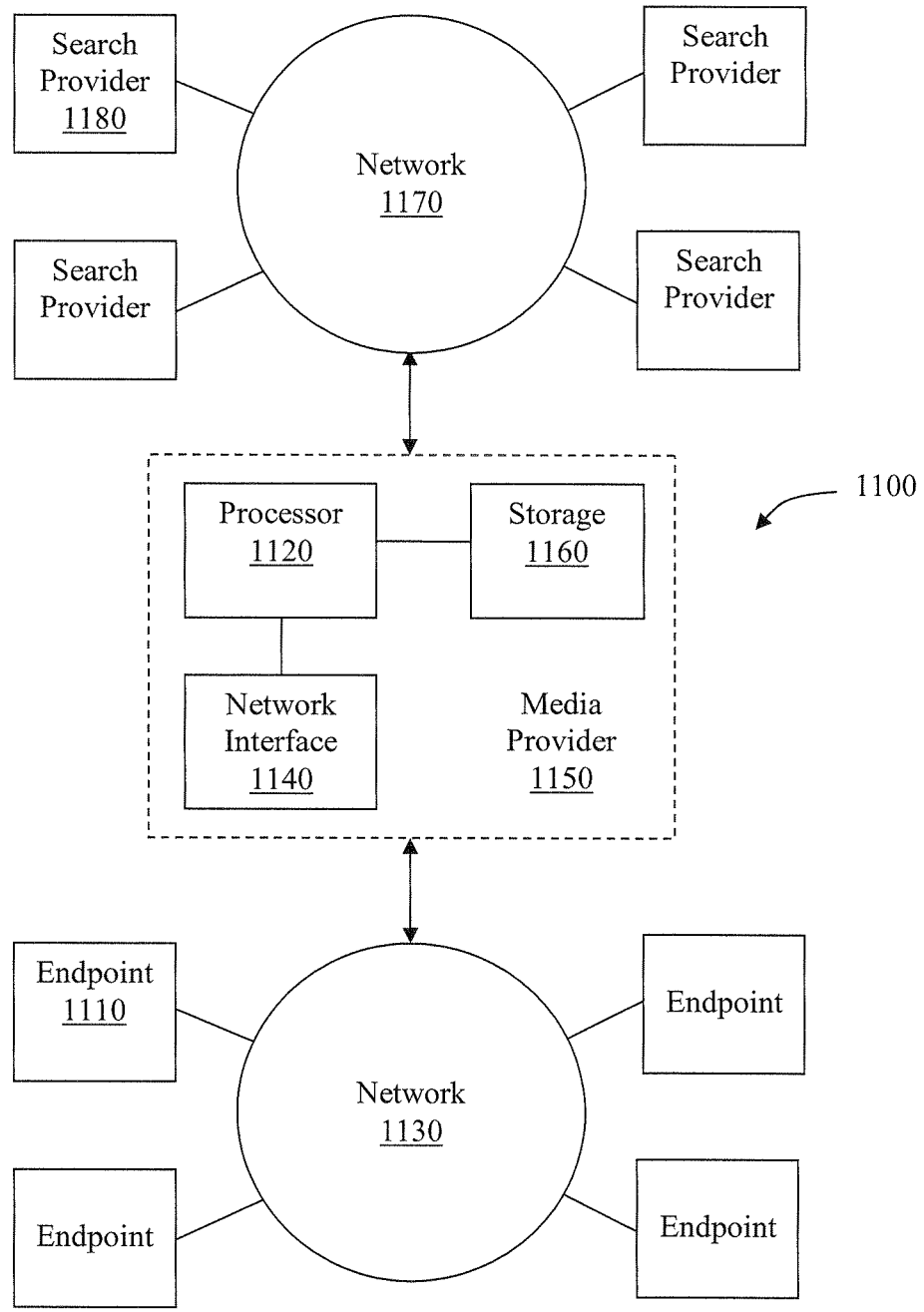
FIG. 11 depicts an example of a media system comprising a media provider.

FIG. 11 depicts an exemplary media system 1100 comprising a media provider 1150. Media provider 1150 may comprise one or more network interfaces 1140 configured to interface with a first network 1130. First network 1130 may operatively couple one or more endpoints comprising an endpoint 1110, with media provider 1150. First network 1130 may comprise a media provider's network, such as a cable network, a satellite network, a cellular network, a telephone network, a broadband network, other types of networks, or any combination thereof. Network interface 1140 may comprise a router, a gateway, a modem, or any combination thereof, configured to operatively couple media provider 1150 to first network 1130.

Media provider 1150 may be configured to distribute media to endpoint 1110. In one example, the distributed media comprises streaming video. Media provider 1150 may receive a data request from endpoint 1110. The data request may indicate that a field in the streaming video has been selected. Responsive to receiving the data request, media provider 1150 may transmit information corresponding to the media content of the streaming video. In one example, the field may be embedded in the streaming video as a hyperlink before being transmitted to endpoint 1110. The field may be transmitted together with the streaming video. In another example, the information may be transmitted separately from the streaming video.

The information may be stored in one or more memory devices 1160. Media provider 1150 may be configured to associate a selected field with the stored information, and identify the information based on the association. Media provider 1150 may further be configured to perform an Internet search for the information. Media provider 1150 may comprise one or more processing devices 1120 configured to process or perform operations. Instructions for performing the operations may be stored in one or more memory devices 1160. One or more processing devices 1120 may be configured to execute the instructions.

One or more network interfaces 1140 may be configured to interface with a second network 1170. Second network 1170 may comprise a private network of databases or search engines. Second network 1170 may comprise a public network, such as the Internet. In one example, media provider 1150 may be configured to request the search from search provider 1180 associated with second network 1170. The search provider 1180 may comprise a third party search engine designated or requested by endpoint 1110.

In one example, media provider 1150 may be configured to operate as a router, a gateway, or an interface between first network 1130 and second network 1170. Endpoint 1110 may request the search from search provider 1180 after media provider 1150 routes the request.

The system and apparatus described above may use dedicated processor systems, micro controllers, programmable logic devices, or microprocessors that may perform some or all of the operations described herein. Some of the operations described above may be implemented in software and other operations may be implemented in hardware. One or more of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may not be limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, minicomputer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. We claim all modifications and variation coming within the spirit and scope of the following claims.

The invention claimed is:

1. A method comprising:
   receiving, by a processing device, user input of one or more user-selectable fields corresponding with media content of streaming media, wherein the one or more user-selectable fields are embedded into the streaming media;
   identifying, by the processing device, search criteria associated with the media content; and
   requesting, by the processing device, a search for information based on the search criteria, wherein the search for information is requested in response to receiving the user input.

2. The method of claim 1, further comprising identifying, by the processing device, a search provider to perform the search based on a configurable selection tool.

3. The method of claim 2, wherein the search provider is identified in the configurable selection tool prior to presenting the streaming media on a display device.

4. The method of claim 1, further comprising identifying, by the processing device, the media content as the streaming media is presented on a display.

5. The method of claim 4, further comprising generating, by the processing device, the one or more user-selectable fields based on the identification of the media content.

6. The method of claim 4, wherein the media content is identified based on optical recognition of the streaming media.

7. The method of claim 4, wherein the media content is identified from a sub-title of the streaming media.

8. The method of claim 1, further comprising causing, by the processing device, the information to be presented on a display device, wherein the information is presented on the display device together with the streaming media.

9. The method of claim 1, further comprising causing, by the processing device, the one or more user-selectable fields to visually overlay the media content.

10. The method of claim 1, wherein the one or more user-selectable fields are embedded into visual objects of the streaming media as hyperlinks.

11. The method of claim 1, wherein the user input is received while the media content is being displayed.

12. A computer-readable memory device having instructions stored thereon that, in response to execution by a processing device, cause the processing device to perform operations comprising:
   identifying a selected field from one or more user-selectable fields of streaming media content, wherein the one or more user-selectable fields comprise hyperlinks embedded in corresponding visual objects of the streaming media content;
   associating search criteria with the streaming media content; and
   requesting, in response to identifying the selected field, a search for information based on the search criteria.

13. The computer-readable memory device of claim 12, wherein the operations further comprise causing the information to be displayed while the streaming media content is being displayed.

14. The computer-readable memory device of claim 12, wherein the operations further comprise:
   causing a list of search results to be displayed; and
   receiving a selection from the list of search results to identify a source to provide the information.

15. The computer-readable memory device of claim 14, wherein the source comprises one or more World Wide Web pages.

16. The computer-readable memory device of claim 12, wherein the operations further comprise:
   causing a list of search engines to be displayed; and
   receiving a user-selected search engine from the list of search engines, wherein the search for information is requested from the user-selected search engine.

17. The computer-readable memory device of claim 16, wherein the user-selected search engine is received prior to identifying the selected field.

18. The computer-readable memory device of claim 12, wherein the operations further comprise causing the information to be displayed as a text box.

19. The computer-readable memory device of claim 12, wherein the operations further comprise causing the information to be played out as audio content.

20. The computer-readable memory device of claim 12, wherein the selected field is identified while the streaming media content is being displayed.

21. An apparatus, comprising:
   a memory device configured to store instructions associated with an application program; and
   a processing device that, in response to executing the instructions stored in the memory device, is configured to:
      receive a selection of a field corresponding with a visual object of streaming media displayed on a display device, wherein the field comprises a hyperlink embedded into the streaming media;
      identify, in response to receiving the selection, search criteria associated with the visual object; and
      request search results based on the search criteria.

22. The apparatus of claim 21, wherein the processing device is further configured to display the search results on the display device together with the streaming media.

23. The apparatus of claim 21, wherein the streaming media comprises a plurality of user-selectable fields and corresponding visual objects of the streaming media, and wherein the user-selectable fields indicate that the corresponding visual objects are associated with different search criteria.

24. The apparatus of claim 21, wherein the processing device is further configured to cause the field to become visible in response to a pointer of an input device passing over the visual object.

25. The apparatus of claim 21, wherein the processing device is further configured to pause the streaming media in response to the field being selected.

26. The apparatus of claim 21, wherein the streaming media is received from a first data source, and wherein the search results are received from a second data source.

27. The apparatus of claim 21, wherein the processing device is further configured to display a list of search engines on the display device, and wherein the search results are requested from a selected search engine.

28. The apparatus of claim 21, wherein the field comprises a descriptive name of the visual object.

29. The apparatus of claim 21, wherein the processing device is further configured to generate the field based on an image recognition analysis of the visual object.

30. The apparatus of claim 21, wherein the hyperlink is embedded in the visual object.

31. An apparatus, comprising:
   means for receiving streaming media, wherein one or more fields of the streaming media identify corresponding media content of the streaming media;
   means for obtaining user input of a selected field from the one or more fields, wherein the selected field is embedded in the streaming media;
   means for identifying search criteria for the corresponding media content; and
   means for requesting, in response to obtaining the user input, a search for information based on the search criteria.

32. The apparatus of claim 31, wherein the means for requesting comprises means for requesting the search from an Internet search engine.

33. The apparatus of claim 31, further comprising means for displaying the selected field together with the streaming media.

34. The apparatus of claim 31, further comprising means for displaying the information together with the corresponding media content.

35. The apparatus of claim 34, wherein the displayed information is provided as text that overlays the streaming media.

36. The apparatus of claim 34, wherein an image of the streaming media is minimized as a picture-in-picture of the displayed information.

37. The apparatus of claim 31, further comprising means for pausing the streaming media in response to receiving the user input.

38. The apparatus of claim 31, further comprising means for selecting a search engine to perform the search.

39. The apparatus of claim 31, further comprising means for selecting from a plurality of devices identified on a display, wherein a selection from the plurality of devices causes an image of the streaming media to be replaced by functional data associated with a corresponding selected device.

40. The apparatus of claim 39, wherein the plurality of devices comprise a television, a personal computer, a mobile phone, and an audio system.

41. The apparatus of claim 39, further comprising means for transferring the functional data between the plurality of devices.

42. The apparatus of claim 39, further comprising means for detecting movement of a selection device, wherein an identification of the plurality of devices becomes visible on the display when the movement is detected.

43. The apparatus of claim 39, further comprising means for operating the plurality of devices from the display.

44. The apparatus of claim 31, wherein the means for receiving, the means for obtaining, the means for identifying, and the means for requesting are housed within a set-top box.

45. The apparatus of claim 31, wherein the means for receiving, the means for obtaining, the means for identifying, and the means for requesting are contained within a television set.

46. The apparatus of claim 31, wherein the user input is received while the corresponding media content is being displayed, and wherein the selected field is embedded as a hyperlink in a visual object of the streaming media.

47. A system, comprising:
one or more memory devices configured to store media content; and
a media content provider configured to:
distribute the media content from the one or more memory devices to one or more endpoints, wherein the media content is distributed as streaming video;
receive a data request from the one or more endpoints, wherein the data request indicates a field in the streaming video has been selected, wherein the field is embedded in a visual object of the streaming video as a hyperlink; and
transmitting information, responsive to receiving the data request, corresponding to the media content.

48. The system of claim 47, wherein the media content provider is further configured to perform an Internet search for the information.

49. The system of claim 47, wherein the media content provider is further configured to request an Internet search for the information.

50. The system of claim 47, wherein the information is stored in the one or more memory devices, and wherein the media content provider is further configured to:
associate the field with the information; and
identify the information based on the association.

51. The system of claim 47, wherein the field is transmitted together with the streaming video.

52. The system of claim 47, wherein the information is transmitted separately from the streaming video.

* * * * *